United States Patent

Engstrom et al.

[11] Patent Number: 4,841,884
[45] Date of Patent: Jun. 27, 1989

[54] DISTRIBUTOR PLATE FOR FLUIDIZED BED REACTOR

[75] Inventors: Folke Engstrom, San Diego, Calif.; Reijo Kuivalainen, Karhula, Finland

[73] Assignee: A. Ahlstrom Corporation, Karhula, Finland

[21] Appl. No.: 200,683

[22] Filed: May 26, 1988

[51] Int. Cl.⁴ .................................................. F23H 3/00
[52] U.S. Cl. .................................... 110/298; 34/57 A; 110/245; 165/104.16; 431/170; 239/DIG. 19
[58] Field of Search ............... 110/298, 245, 263, 299, 110/300; 34/37 A; 431/7, 170; 165/104.16; 239/553.3, DIG. 19

[56] References Cited

U.S. PATENT DOCUMENTS

| | | |
|---|---|---|
| 3,818,606 | 6/1974 | Marcellini . |
| 3,933,445 | 1/1976 | Mueller et al. . |
| 4,257,171 | 3/1981 | Johnson et al. . |
| 4,387,667 | 6/1983 | Goodstine et al. ................. 110/245 |
| 4,510,874 | 4/1985 | Hasenack ....................... 110/263 X |
| 4,565,136 | 1/1986 | Nakamura . |
| 4,628,868 | 12/1986 | Eaton ............................. 110/245 X |

FOREIGN PATENT DOCUMENTS 441863 3/1985 Sweden .

OTHER PUBLICATIONS

"Pall Porous Metal Filter Media", brochure, admitted prior art.
"Hi-Tech Ceramics Inc.", brochure, admitted prior art.
"Cerapor", brochure, admitted prior art.
"Public Use Drawings", of nozzle believed to have been publicaly used in the United States.

Primary Examiner—Edward G. Favors
Attorney, Agent, or Firm—Nixon & Vanderhye

[57] ABSTRACT

In a fluidized bed reactor, nozzles are provided for distributing fluidizing gas from a windbox into the reactor while preventing the backflow of solid particles through the nozzle into the windbox. The nozzle defines an upper part of high heat and wear resistant material adapted to contact the mass of particles. At least one opening is defined in each nozzle through which fluidizing gas passes between the upper part and the windbox, and a solid, though porous, material abuts or defines the opening for allowing the passage of gas while preventing passage of solid particles. The nozzle may comprise a stand pipe having a sintered metal portion disposed below the upper part. Other constructions provide the solid mass as a metal wire mesh acid proof filter, or as a porous ceramic material, or as a high temperature ceramic material. The solid mass may have pores with a pore size of between about 50–1,000 micormeters. The solid mass may be defined by a pair of concentric adjacent porous ceramic tubes with different effective gas permeabilities. A horizontal solid metal ring may have openings in it, with the ring supported above the windbox so that gas can flow through the openings, the porous solid material sandwiched between the upper part and the ring.

22 Claims, 2 Drawing Sheets

DISTRIBUTOR PLATE FOR FLUIDIZED BED REACTOR

BACKGROUND AND SUMMARY OF THE INVENTION

Many fluidized bed reactors contain a mass of fine particles. In the lower portion of the reactor a dispersion plate is provided having a plurality of injection nozzles through which fluidizing gas is distributed from a windbox into the reactor. The gas (such as air) introduced through the nozzles fluidizes the mass of fine particles. Such fluidized bed reactors are typically utilized in a variety of different processes such as combustion, gasification, and heat transfer processes. Depending upon the particular processes, sand, limestone, coal, ash, or pieces of refractory material broken off from the reactor wall, are fluidized. This results in a severe environment for the injection nozzles, subjecting them to corrosion and erosion.

In conventional fluidized bed reactors, especially under low load conditions, particles tend to build up near the injection nozzles and adversely affect the air distribution provided by the nozzles. Fine particles in the mass of particles interfere with the air supplied through the nozzles and can cause plugging of the air openings. Further, there is a tendency for particles to back flow through the nozzles into the windbox (air chamber). This occurs when the supply of air through the injection nozzles is stopped, resulting in the pressure difference between the reactor chamber and the windbox under the distribution plate to reverse. The pressure above the distribution plate grow higher than the pressure in the windbox beneath the distribution plate and consequently the fine particles of the particle mass tend to flow backward through the nozzles into the windbox.

Backflow tendencies also cause problems under steady state running conditions. The pressure in the fluidized bed reactor is always pulsating and can momentarily and locally decrease enough to cause backflow. Then at low load conditions, the tendency grows as the pressure difference between both sides of the distribution plate becomes smaller.

The backflow of particles through the nozzle is especially a problem in circulating fluidized beds when the bed consists of fine particles fluidized at high flow rates, entrained from the reactor and recycled after gas separation.

Not only does backflow cause problems in the windbox, the fine particles flowing back into the nozzles often move back and forth within the nozzles as a result of pulsations in the reactor. This back and forth flow of particles in the nozzles, through the openings in the nozzles, causes the nozzles to wear out prematurely.

The backflow problem can be avoided by keeping the pressure difference sufficiently high by increasing the flow of fluidizing gas pursuant to the formula $dp = kV^2/2$, which indicates that the pressure different (dp) is dependent on gas flow V and gas density, the value k equal to the nozzle constant. However due to high power costs, it is not feasible to eliminate backflow by increasing the pressure difference.

While the problem of backflowing particles in fluidized beds is well known, and many solutions have been proposed, such solutions have not been entirely successful. It is believed that an optimum design which provides sufficient pressure drop to fluidize the bed evenly yet still allows for operation at low load without backflow has not yet been provided.

According to the present invention, injection nozzles for a fluidized bed reactor are provided which overcome the above-mentioned problems, and thus allow a substantially even bed fluidization while still allowing for operation at low loads without backflow. The nozzles according to the present invention are better suited to the corrosive and erosive conditions normally existing in fluidizing beds, and are less sensitive to mechanical shock.

According to the broadest aspect of the present invention, a fluidized bed reactor is provided containing a mass of fine particles, and in its lower part a dispersion plate having a plurality of injection nozzles through which fluidizing gas is distributed from a windbox into the reactor. At least some of the injection nozzles comprise an upper part, means defining at least one opening, and solid means. The upper part is of high heat and wear resistant material adapted to contact the mass of particles. The means defining at least one opening in each nozzle allows passage of fluidizing gas through the opening(s) between the upper part of the nozzle and the windbow. Solid means substantially abut the means for defining the openings for allowing passage of gas therethrough but preventing passage of the fine particles therethrough. The solid means preferably comprise a sintered metal. Alternatively the solid means may comprise a metal wire mesh acid proof filter, a porous ceramic material, or a high temperature ceramic filter. For example a pair of concentric adjacent porous ceramic tubes may be provided with different effective gas permeabilities.

A solid walled stand pipe may extend upwardly from the windbox with the openings above the stand pipe and directed downwardly outwardly. The stand pipe may be disposed interiorly of the upper part with the solid means supported by the stand pipe and abutting the upper part. The stand pipe may support a horizontal solid metal ring having the openings therein with the solid means sandwiched between the upper part and the ring. The solid means may comprise a tubular element having a generally vertical axis, and the solid means may have pores with a pore size of between about 50-1,000 micrometers. Where the solid means comprises sintered metal, it is preferably in the form of a tube disposed between and abutting the stand pipe and the upper part.

It is the primary object of the present invention to provide for even distribution of fluidizing gas while preventing the backflow of solids into the gas injection nozzles, in a fluidized bed reactor. This and other objects of the invention will become clear from an inspection of the detailed description of the invention and from the appended claims.

DETAILED DESCRIPTION OF THE DRAWINGS

Figure 1:
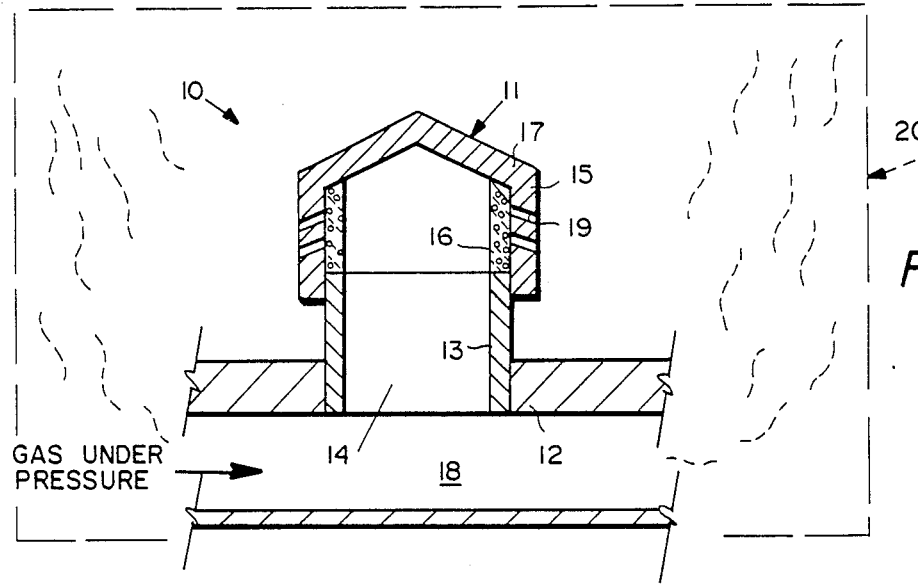
FIG. 1 is a schematic cross-sectional side view of one exemplary gas injection nozzle according to one embodiment of this invention, shown in a fluidizing bed reactor.

FIG. 1 shows within a fluidized bed of particles 10 an exemplary gas injection nozzle 11 according to a first embodiment of the invention. The nozzle 11 is disposed at a grid or distribution plate 12 with a stand pipe 13 fitted in an opening 14 defined in the plate 12. The stand pipe 13 is preferably a solid wall tube, for example it can be constructed of stainless steel such as AISI 304 stainless steel. Gas under pressure is disposed in the area beneath the plate 12, which may be known as a windbox or air chamber 18. The nozzle 11, distribution plate, and the like are disposed within a typical fluidized bed reactor 20, which may be of either the circulating or non-circulating type.

For the embodiment of FIG. 1, an upper part 17 of the nozzle 11 is provided of a high heat and wear resistant material, which is adapted to contact the mass of particles 10. For example this can be of a heat resisting steel such as AISI 309. The nozzle 11 also comprises means defining at least one opening 19, and preferably a plurality of openings, through which fluidizing gas passes between the upper part 17 and the distribution plate 12 of the windbox 18. In this particular embodiment, the openings 19 are defined by a downwardly extending portion 15 of the upper part 17. The nozzle 11 further comprises solid means 16 substantially abutting the means 15 for defining the opening 19, the solid means 16 allowing passage of gas therethrough but preventing passage of particles 10 from the reactor 20 therethrough into the windbox 18. The openings 19 may be channels, slots, round holes, or the like. In coal combustion processes round holes with a diameter of about 1–15 mm are utilized. In the FIG. 1 embodiment, the opening defining means 15 comprises an outer part, while the solid means 16 comprises an inner part.

In the embodiment of FIG. 1, the inner part 16 is formed of a porous solid material such as ceramic with pores much smaller than the openings 9. The portion 15 protects the inner porous material 16 and thus a relatively cheap material may be utilized for the porous material 16 since it is not exposed to particulate flow and its corrosive influence. For example, the porous ceramic material 16 can be a high temperature ceramic filter, such as sold under the trademark "Cerapor", or sold under the trademark "Reticel" (by Hi-Tech Ceramics Inc.).

Note that in the FIG. 1 embodiment the upper part 17 has a generally slanted, roof-shaped construction.

Figure 2:
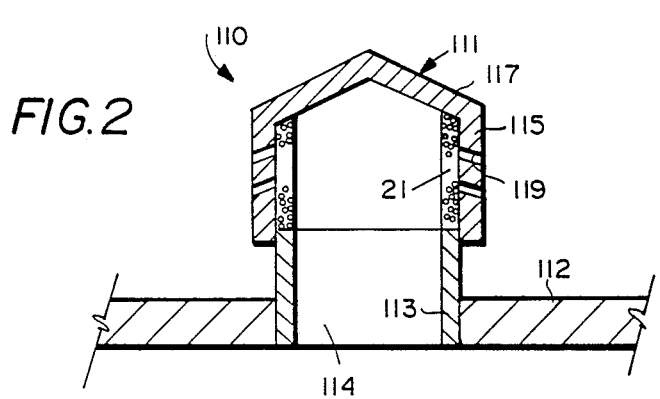
FIG. 2 is a schematic cross-sectional side view of another exemplary gas injection nozzle, according to a second embodiment of the invention.

In the embodiment illustrated in FIG. 2, structures comparable in function to those illustrated in FIG. 1 are indicated by the same reference numeral only preceded by a "1". In this embodiment, most of the elements are the same as in FIG. 1 except that instead of a porous ceramic material 16 provided as an inner part, the inner part is provided by a metal filter 21. The metal filter 21 is a conventional acid-proof filter made of, for example, 0.22 mm wire which forms meshes of about 0.50 mm. This particular embodiment is especially easy to retrofit into existing nozzles, for example to improve leaking existing nozzles. Of course it can also be utilized in new constructions.

For both the FIGS. 1 and 2 nozzles 11, 111, as well as for other nozzles according to the invention, since the fine bed material is not in contact with the solid means, it does not penetrate into the pores (where ceramic material is utilized) or grid openings (where a metal filter is utilized) even if, during repair or inspection of the reactor, someone walks on the bed and generates high local pressures.

Figure 3:
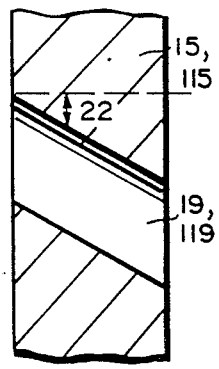
FIG. 3 is a detail cross-sectional view of the means defining gas openings of FIGS. 1 and 2, showing the downward, outward sland thereof.

FIG. 3 illustrates the preferred form of the openings 19, 119, in the part 15, 115 of the nozzles 11, 111. Preferably, the openings 19, 119 make an angle 22 which is between 5°–30°, sloping downwardly and outwardly. This allows for the best distribution of gas from the nozzles 11, 111 while minimizing the chance of backflow of particles.

Figure 4:
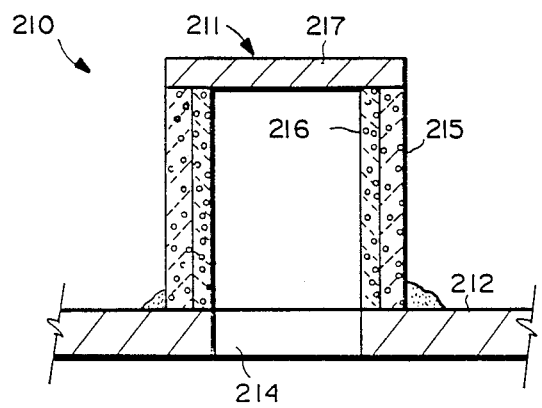
FIG. 4 is a schematic cross-sectional side view of a third embodiment of an injection nozzle according to the invention.

In the embodiment illustrated in FIG. 4, structures comparable to those in FIG. 1 are illustrated by the same reference numeral only preceded by a "2". In this embodiment no stand pipe is utilized, but rather a pair of concentric tubes 215, 216 extend from the distribution plate 212, surrounding the opening 214, up to the upper part 217 of the nozzle 211. In this case the upper part 217 is a flat plate. The tubular portions 215, 216 preferably both comprise porous ceramic pipes, with the outer pipe 215 having relatively large pores, and the inner pipe 216 relatively small pores, so that the outer pipe 215 comprises means defining openings for injection of gas while the inner pipe 216 comprises solid means for preventing passage of particles therethrough. While both of the tubes 215, 216 can be made of the same material, it may be desirable to make the outer tube 215 of a wear and heat resistant material, or—while making both tubes of the same material—treating the external side of the outer tube 215 to create a more resistant cover.

Figure 5:
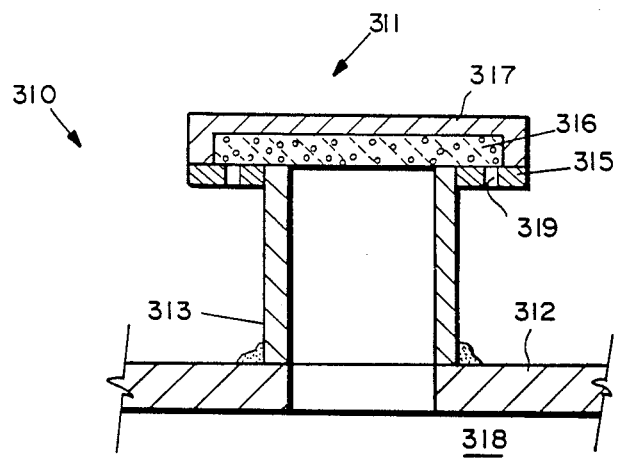
FIGS. 5 through 7 are schematic cross-sectional side views of fourth, fifth, and sixth different exemplary embodiments of nozzles according to the invention.

In the FIG. 5 embodiment, structures comparable to those in the FIG. 1 embodiment are illustrated by the same reference numeral only preceded by a '3'. In this embodiment, the means 315 defining the openings 319 comprises a horizontal solid metal ring. The stand pipe 313 supports the ring above distribution plate 312 of the windbox 318, and the solid means 316 is sandwiched between the upper part 317 and the ring 315. The solid means 316 preferably comprises a porous ceramic material which allows the passage of gas therethrough but prevents the backflow of particles, and is protected from the corrosive environment of the reactor by the upper part 317 and ring 315.

Figure 6:
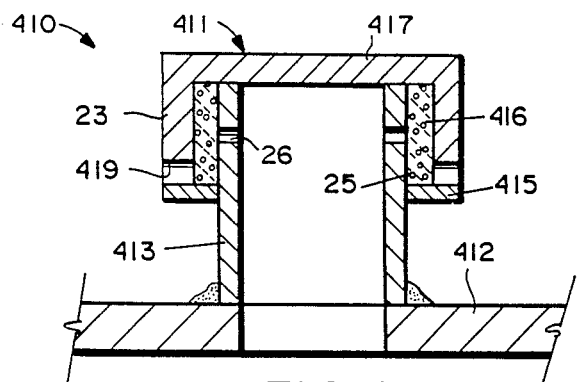

In the FIG. 6 embodiment, structures comparable to those in the FIG. 1 embodiment are illustrated by the same reference numeral only preceded by a "4". In this embodiment, the means defining the openings 419 comprises a solid horizontally extending metal ring 415 and a downwardly extending portion 23 of the upper part 417. The stand pipe 413 is welded to the ring 415, and also engages the bottom of the upper part 417. A plurality of relatively large openings 26 are provided in the stand pipe 413, and between the downwardly extending portion 23 of the upper part 417 and the stand pipe 413 the solid means 416 (preferably porous ceramic material) is provided. Solid means 416 is preferably in the form of a tube.

Figure 7:
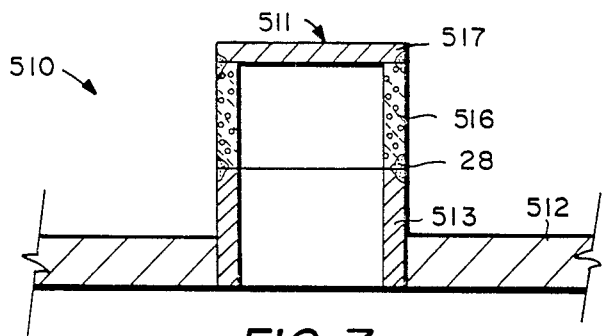

In FIG. 7 a nozzle 511 is illustrated in which components functionally similar to those in the FIG. 1 embodiment are illustrated by the same reference numeral only preceded by a "5". This embodiment is particularly advantageous since solid means 516 comprises a sintered metal tube which may welded, as illustrated at 28, to the stand pipe 513 (and also can be welded to the upper part 517). The sintered metal 516 also can be machined with ordinary metal machining tools, something that cannot be done with ceramic filters. In this embodiment, the means defining an opening for gas flow is at the top of the stand pipe 513 and the bottom of the upper part 517, with the solid means 516 completely filling the opening (the area between 513 and 517). This embodiment also has the fewest parts.

The sintered metal tube 516 may be of any conventional sintered metal that is suitable, such as a Pall porous metal filter, such as Pall PSS 316L stainless steel.

For all of the solid means 16, 216, 316, 416, 516, pores provide for the flow of gas, and a pore size of between about 50-1,000 micrometers is desirable. In all of the embodiments of FIGS. 1 through 6, in which inner and outer parts are provided, it will be seen that the inner parts are essentially in contact with the outer part so that little or no free space is formed in between the outer and inner parts for solid material particles to accumulate, which is a significant advantageous result.

It will thus be seen that according to the present invention nozzles in a fluidized bed reactor have been provided which are able to withstand the corrosive conditions and mechanical forces that may typically be encountered in fluidized bed reactors, evenly distribute the fluidizing gas, prevent the backflow of particles from the reactor into the windbox, and can accomplish these desirable results over long periods of time with little maintenance. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims to cover all equivalent structures and devices.

What is claimed is:

1. A fluidized bed reactor containing a mass of fine particles, and in its lower part a dispersion plate having a plurality of injection nozzles through which fluidizing gas is distributed from a windbox into the reactor, at least some of said injection nozzles comprising:
    an uppermost part of high heat and wear resistant material, on which the mass of particles would rest, being partially supported thereby, if the particles were subjected only to gravitational action, said uppermost part overlying any passageway from said windbox;
    means defining at least one opening in each injection nozzle through which fluidizing gas passes between said upper part and said windbox; and
    solid means substantially abutting said means for defining each said opening for allowing passage of gas therethrough but preventing passage of the particles therethrough.

2. A reactor as recited in claim 1 wherein said solid means comprises sintered metal.

3. A reactor as recited in claim 1 wherein said solid means comprises a metal wire mesh acid proof filter.

4. A reactor as recited in claim 1 wherein said solid means comprises a porous ceramic material.

5. A reactor as recited in claim 1 wherein said solid means comprises a high temperature ceramic filter.

6. A fluidized bed reactor containing a mass of fine particles, and in its lower part a dispersion plate having a plurality of injection nozzles through which fluidizing gas is distributed from a windbox into the reactor, at least some of said injection nozzles comprising:
    an upper part of high heat and wear resistant material, adapted to contact the mass of particles;
    means defining at least one opening in each injection nozzle in a downwardly extending portion of said upper part, through which opening fluidizing gas passes between said upper part and said windbox; and
    solid means substantially abutting said means for defining each said opening for allowing passage of gas therethrough but preventing passage of the particles therethrough.

7. A reactor as recited in claim 6 wherein said means defining an opening comprises means defining a plurality of openings slanted downwardly, outwardly, 8. A reactor as recited in claim 7 further comprising a solid walled stand pipe extending upwardly from said windbox.

9. A reactor as recited in claim 8 wherein said stand pipe is disposed interiorly of said upper part, and wherein said solid means is supported by said stand pipe and abuts said upper part.

10. A reactor as recited in claim 9 wherein said upper part has a generally slanted roof-shaped top portion.

11. A fluidized bed reactor containing a mass of fine particles, and in its lower part a dispersion plate having a plurality of injection nozzles through which fluidizing gas is distributed from a windbox into the reactor, at least some of said injection nozzles comprising:
    an upper part of high heat and wear resistant material, adapted to contact the mass of particles;
    means defining at least one opening in each injection nozzle through which fluidizing gas passes between said upper part and said windbox; and
    solid means substantially abutting said means for defining each said opening for allowing passage of gas therethrough but preventing passage of the particles therethrough, comprising a pair of concentric adjacent porous ceramic tubes with different effective gas permeabilities.

12. A reactor as recited in claim 11 wherein said upper part is a flat solid metal plate.

13. A fluidized bed reactor containing a mass of fine particles, and in its lower part a dispersion plate having a plurality of injection nozzles through which fluidizing gas is distributed from a windbox into the reactor, at least some of said injection nozzles comprising:
    an upper part of high heat and wear resistant material, adapted to contact the mass of particles;
    means defining at least one opening in each injection nozzle through which fluidizing gas passes between said upper part and said windbox;
    solid means substantially abutting said means for defining each said opening for allowing passage of gas therethrough but preventing passage of the particles therethrough; and
    said means defining said openings comprising a horizontal solid metal ring having openings therein, and means supporting said ring above said windbox so that gas can flow through said openings, with said solid means sandwiched between said upper part and said ring.

14. A reactor as recited in claim 13 wherein said means for suporting said ring comprises a stand pipe, and wherein said solid means are sandwiched between said stand pipe, ring, and upper part.

15. A reactor as recited in claim 14 wherein said solid means comprises a tubular element having a generally vertical axis.

16. A reactor as claimed in claim 1 wherein said means defining said openings comprises a stand pipe upstanding from said windbox, and wherein said solid means comprises a tube of sintered metal disposed between and abutting said stand pipe and said upper part.

17. A reactor as recited in claim 1 wherein said solid means has pores with a pore size of between about 50–1,000 micrometers.

18. A fluidized bed reactor containing a mass of fine particles, and in its lower part a dispersion plate having a plurality of injection nozzles through which fluidizing gas is distributed from a windbox into the reactor, at least some of said injection nozzles comprising:
a sintered metal portion allowing the passage of gas from the windbox therethrough to the reactor while preventing the passage of particles from the reactor therethrough; and
a stand pipe upstanding from said windbox, having an uppermost part of high heat and wear resistant material on which the mass of particles would rest, being partially supported thereby, if the particles were subjected only to gravitational action, said uppermost part overlying any passageway from said windbox, said sintered metal portion disposed between and abutting said stand pipe and said uppermost part.

19. A fluidized bed reactor containing a mass of fine particles, and in its lower part a dispersion plate having a plurality of injection nozzles through which fluidizing gas is distributed from a windbox into the reactor, at least some of said injection nozzles comprising:
an upper part of high heat and wear resistant material, adapted to contact the mass of particles;
an outer part having means defining openings for fluidizing gas therein; and
an inner part having means defining inner openings therein for fluidizing gas, said inner openings smaller than said outer openings and said inner part essentially in contact with said outer part so that little or no free space is formed in between the inner and outer parts for solid particles to accumulate so that fluidization of gas occurs but backflow of solid particles through the nozzles into the windbox does not.

20. An injection nozzle for a fluidized bed reactor containing a mass of fine particles, comprising:
an uppermost part of high heat and wear resistant material, adapted to contact the mass of particles in the fluidized bed reactor;
means defining at least one opening in a downwardly extending portions of said uppermost part, through which opening fluidizing gas passes; and
solid means substantially abutting said means for defining said opening for allowing passage of gas therethrough but preventing passage of the particles therethrough.

21. An injection nozzle for a fluidized bed reactor adapted to contain a mass of fine particles, comprising:
an upper part of high heat and wear resistant material, adapted to contact the mass of particles in the fluidized bed reactor;
means defining at least one opening through which fluidizing gas passes; and
solid means comprising a pair of concentric adjacent porous ceramic tubes with different effective gas permeabilities, substantially abutting said means for defining said opening for allowing passage of gas therethrough but preventing passage of the particles therethrough.

22. An injection nozzle for a fluidized bed reactor adapted to contain a mass of fine particles, comprising:
an upper part of high heat and wear resistant material, adapted to contact the mass of particles;
means defining at least one opening in said injection nozzle through which fluidizing gas passes;
solid means substantially abutting said means for defining said opening for allowing passage of gas therethrough but preventing passage of the particles therethrough; and
said means defining said at least one opening comprising a horizontal solid metal ring having openings therein, and means supporting said ring so that gas can flow through said openings, with said solid means sandwiched between said upper part and said ring.

* * * * *